United States Patent [19]

Iverson

[11] Patent Number: 4,687,022
[45] Date of Patent: Aug. 18, 1987

[54] PRESSURE RELIEF VALVE AND REGULATOR

[76] Inventor: Jacob E. Iverson, 181 SW. 15th Ct., Pompano Beach, Fla. 33060

[21] Appl. No.: 817,529

[22] Filed: Jan. 9, 1986

[51] Int. Cl.[4] .............................................. F16K 15/00
[52] U.S. Cl. .................................. 137/531; 137/538; 137/494; 267/172; 267/173
[58] Field of Search ...................... 267/172, 173, 20 R; 137/531, 538, 494

[56] References Cited

U.S. PATENT DOCUMENTS

| | | | |
|---|---|---|---|
| 306,568 | 10/1884 | Wilder | 137/531 |
| 1,716,832 | 6/1929 | Odend'Hal | 137/531 |
| 2,280,937 | 4/1942 | Thornhill | 137/531 X |
| 2,326,462 | 8/1943 | Johnson | 137/494 |
| 4,006,823 | 2/1977 | Berger | 267/173 X |
| 4,356,977 | 11/1982 | Hofmann | 267/20 R X |
| 4,400,186 | 8/1983 | Leunig | 267/173 X |

Primary Examiner—Harold W. Weakley
Attorney, Agent, or Firm—Joseph Zallen

[57] ABSTRACT

A pressure relief valve and regulator in which the valve chamber has a side port for connecting to the pressure line to be monitored. The valve seat opens to an exhaust and has a diameter slightly larger than the chamber diameter. The valve incorporates a double ended piston, spring, and cam whereby the cam offsets the normal compression gradient of the spring by rotating as the piston moves in and out.

2 Claims, 2 Drawing Figures

PRESSURE RELIEF VALVE AND REGULATOR

BACKGROUND OF INVENTION

This invention relates to a novel valve and cam-spring arrangement. In particular, it relates to a pressure relief valve and regulator which can be used with extremely high pressures, as for example 10,000 to 70,000 pounds per square inch.

The relief valves which have been previously described typically comprise a spring exerting pushing pressure on a ball against the valve seat. Rapid motion of the spring against the valve causes vibration, thus eventually damaging the ball and the valve seat. A spring of sufficient strength is used to hold the check ball over the escape port. In high pressure, this method dictates extremely strong springs and/or very small ports. The spring pressure alone is often sufficient to damage the seat.

One object of the present invention is to provide a safety relief and regulator valve that will be long-lasting and is suitable for use with high pressure liquids and gases.

Other objects and advantages of this invention will be apparent from the description and claims which follow taken together with the appended drawings.

SUMMARY OF INVENTION

In general this invention comprises a valve chamber having a forward opening and a forward cavity which extends to the forward opening and has a side opening. This diameter of the forward opening is slightly greater than the diameter of the cavity. The valve movable in the chamber comprises a valve stem and a valve seating portion. The valve seating portion is cooperable with the forward opening. The valve stem comprises a portion movable within and of a diameter less than the diameter of the forward cavity, and a piston portion rearward of the cavity.

A cam arrangement is also provided for cooperation with a movable rod as, for example, a valve stem. The arrangement comprises a rear spring means cooperable with the movable rod, a rear cam means cooperable with the rod and the spring means whereby rearward motion of the rod against the spring means causes the cam means to reduce pressure on the spring means.

In particular, this invention comprises a regulator and relief valve incorporating a double-ended piston, having a slightly smaller diameter on the end opposite the valve and a cam that offsets the normal compression gradient of the spring by rotating as the piston moves in and out. Examples of systems in which the valve of this invention is useful are gas pipelines, hydraulic systems, compressed air systems and water spraying devices.

The valve of this invention includes in its preferred form:

(a) a valve chamber;
(b) a side port in the chamber for connecting to the pressure line to be monitored;
(c) a valve seat in the chamber opening to an exhaust and having a diameter slightly larger than the chamber diameter as for example 0.520 inches in the valve seat and 0.500 inches in the valve chamber;
(d) a valve member which cooperates with the valve seat;
(e) a valve stem connected to the valve, extending rearwardly in the valve chamber and including a seal located to the rear of the side port;
(f) a longitudinal slot in the valve stem rearwardly of the seal
(g) a moveable pin extending through the slot;
(h) a separate cam attached to each end of the pin; each cam having a forward surface, an upper rearward surface and a lower rearward surface;
(i) a fixed stop engageable with the forward surfaces;
(j) a stop mounted on the valve stem and engageable with the lower surface;
(k) spring retention means engageable with said upper surface and including a spring.

The entire device is characterized in that the forward movement of the stem upon reaching the threshold pressure causes the cam to push back on the spring retention means thus lowering the net force on the spring. The double-ended piston with a slightly smaller diameter on the inner side of the valve chamber than on the valve end serves to cancel out most of the spring pressure requirement. Liquid or gas entering the valve chamber therefore exerts nearly as much pressure on the end of the piston as on the escape port This results in a much more manageable spring size to hold back extremely high pressure. For example, to hold back 10,000 psi on a 0.500 inch diameter port (0.480 on bottom) a spring of only slightly over 150 pound force is needed, instead of the normally needed 1960 pounds force. Once the pressure exceeds 10,000 psi the valve is forced out and the fluid escapes out until the pressure drops back to 10,000 psi and the valve closes. The pressure on the seat never exceeds the 150 pounds exerted by the spring.

Because a spring exerts more and more pressure as it compresses, valves do not respond to sensitive pressure changes and open very little in actual operation, allowing the pressure to rise more than desired to release excess pressure. To overcome this problem and eliminate the pressure rise as the spring is compressed, this valve incorporates a cam action that offsets the normal compression of the spring by rotating as the piston moves back and forth causing the spring force to remain static, always exerting the same pressure on this piston whether wide open or closed. The cams pivot on a floating pin which can slide on the shaft seeking its own center. The cams are prevented from rotating by adjusting a cap until the valve is forced open by excess pressure. As the valve stem moves outwardly, the cams are free to rotate within the permitted amount of motion since the adjusting cap is stationary and valve stem is moving outwardly. As the cams carry the spring pressure to the valve stem by exerting pressure on the thrust bearing which is firmly attached to the stem, the stem moves outwardly normally compressing the spring further. The cams rotate decreasing in length at the proper rate so in operation the spring does not compress further and does not increase its resistance to open further. In fact, proper cam design can allow the spring pressure to become greater or weaker as the stem moves outwardly. Cam lengths and angles will also affect compression change of the spring and may be programmed to achieve desired results.

On prior art relief valves, a sprng typically exerts a pushing pressure on a valve seat ball causing the ball to vibrate rapidly when in the relief mode, thus damaging both the ball and seat. With the valve of the present invention this is not done. Instead, the seat ball is pulled away from. Vibration and associated damage is thereby eliminated, since the ball remains in the middle of the port instead of bouncing from side to side and a symmetrical sheet of fluid escapes past the seat.

In relief valves which have been described in the prior art, the usual arrangement is to provide a spring of sufficient strength to hold a check ball or check valve over the escape port. While such devices may be satisfactory for low or moderate pressure, it is not satisfactory with high pressure because extremely strong springs or very small ports are required. The spring pressure alarm is often sufficient to damage the valve seat.

Another problem that this present invention overcomes is the common vibration in the relief mode where the ball vibrates upon opening and causes damage to both the ball and the valve seat. Further, the relief valves of this invention are smaller and lighter in weight than prior art devices and the springs have little cause for metal fatigue.

This invention is also applicable to other types of valves such as are used in hydraulic and air systems, fire control units and pop-off valves. Smaller springs are possible and faster responses obtainable because less leverage is required. When applied to hand-operated valves, less energy is needed and a faster response is obtained.

In addition to its use in valves, the double-end piston arrangement of this invention can be used as a power assist. The cam arrangement can also be used where a constant spring arrangement is desired in such products as music boxes, clocks, timers, door closers and suspension systems by attaching to the operable movable rod in such devices.

SPECIFIC EXAMPLE OF THE INVENTION

Figure 1:
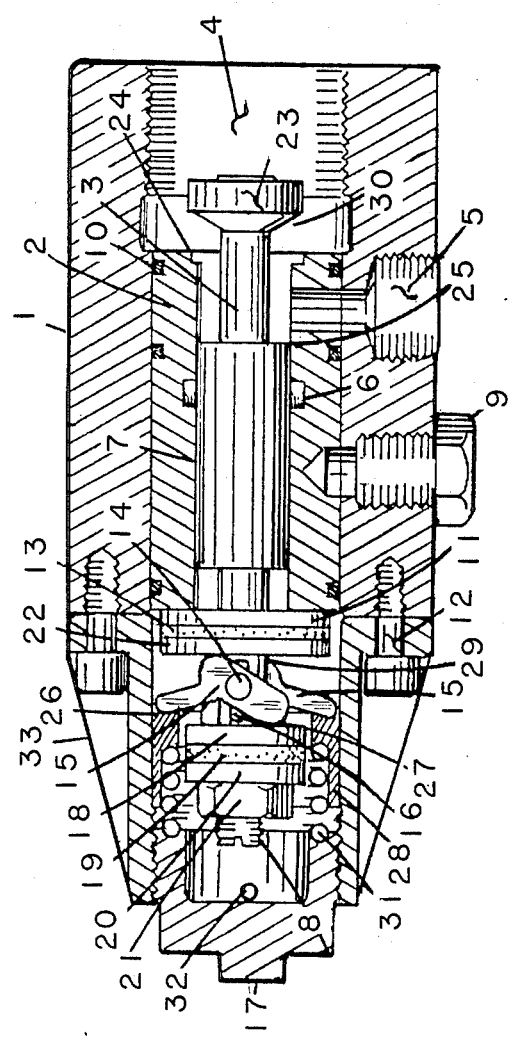
FIG. 1 is a longitudinal cross section of one example of the invention showing the position of the parts of the device when liquid or gas under pressure is flowing past the valve to an open port as for example a spray gun.

Referring now to the drawings, the valve comprises a body portion 1 which enclosed a hollow cylinder 2. The body 1 has an open-end 4 which is threaded and acts as an outlet port. The open end of the hollow cylinder 2 forms the valve seat 24. Spaced within the cylinder is conical valve 23 having a stem 3 of reduced diameter and a back stem portion 7 of full diameter. Opening into the chamber around the reduced stem 3 is the inlet port 5. Seals 6 and 10 are provided to prevent leakage of fluid. Attached to the back end of the hollow cylindrical body 1 is a bonnet 33 in whose end is a threaded cap 17.

The body 1 is a hollow cylinder having a threaded relief or exhaust opening 4 and a threaded inlet or monitoring port 5. Inner hollow cylinder 2 is fitted into body 1 and has seals 10 and end offset 24 opening into relief opening 4. This provides a valve diameter 25 having a uniform diameter except for end portion 24 which has a slightly larger diameter, as, for example, 0.520 inches for portion 24 and 0.500 inches for chamber 25. Cylinder 2 has an opening registrable with inlet port 5. Threaded member 9 is used to lock portions 1 and 2 together.

Valve stem 3 terminating in valve 23 at one end is spaced within valve chamber 25 and has an enlarged portion 7 filling the diameter of the valve chamber 25 so that with seals 6 fluid from portion 5 cannot flow past the enlarged portion 7.

Back of valve chamber 25 is a bonnet 33 attached by four screws 12 to body 1. Bonnet 33 has interior threading for engaging an adjustable end cap 17, thus providing a rear chamber in which the rear end of valve stem 3 is movable. Stem 3 has a slot 16 through which pin 14 extends. The ends of pin 14 are connected to cams 15 and 15A.

Valve stem 3 carries a slidable bearing abutting both the end of cylinder 2 and the forward arms 29 of cams 15 and 15A. A bearing 18-19-20, held by threaded locking nut 21, on said valve stem 8 abuts the inner rear arms 27 of cams 15 and 15A. The outer rear arms 26 of cams 15 and 15A abut slidable spring retainer 28. Spring 31 is positioned between end cap 17 and spring retainer 28.

Figure 2:
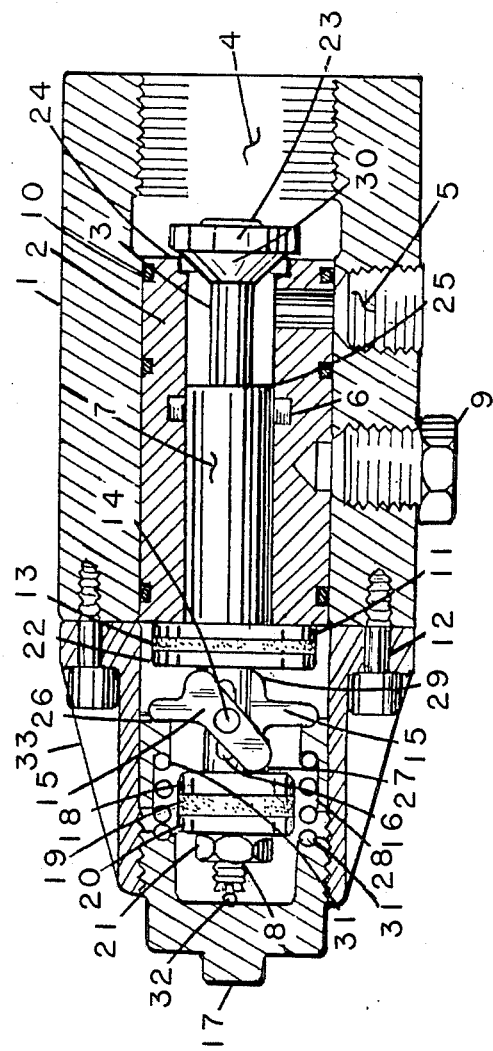
FIG. 2 is a longitudinal cross section showing the position of the various parts when the escape or outlet port is closed, thus causing backup pressure to shut the valve.

As shown in FIG. 1, when the fluid pressure is the inlet portion is below the relief pressure, e.g. 10,000 psi, the cams offset the normal spring pressure. When there is excess pressure, the valve opens as in FIG. 2, but the cam adjusts to minimize the spring force.

I claim:
1. A pressure relief and regulator valve comprising:
   (a) a valve chamber;
   (b) a side port in said chamber for connecting to the pressure line to be monitored;
   (c) a valve seat in said chamber opening to an exhaust and having a diameter slightly larger than the chamber diameter;
   (d) a valve member which cooperates with said valve seat;
   (e) a valve stem connected to said valve member, extending rearwardly in said valve chamber and including a piston portion located to the rear of said side port and a rear extension out of said chamber;
   (f) a longtitudinal slot in said extension;
   (g) a moveable pin extending through said slot;
   (h) a separate cam attached to each end of said pin; each cam having a forward surface, an upper rearward surface and a lower rearward surface;
   (i) a fixed stop engagable with the forward surfaces;
   (j) a stop mounted on the valve stem and engageable with the lower surfaces; and
   (k) spring retention means engageable with said upper surfaces and including a spring.
2. A cam arrangement for cooperation with a movable rod comprising:
   (a) rear spring means cooperable with said movable rod;
   (b) rear cam means cooperable with said movable rod and said spring means whereby rearward motion of said rod against said spring means causes said cam means to reduce pressure on said spring means;
   (c) a longitudinal slot in said rod;
   (d) a movable pin extending through said slot;
   (e) a separate cam attached to each end of said pin; each cam having a forward surface, an upper rearward surface and a lower rearward surface;
   (f) a fixed stop engageable with the forward surfaces;
   (g) a stop mounted on the rod and engageable with the lower surfaces; and
   (h) spring retention means engagable with said upper surfaces and including a spring.

* * * * *